United States Patent [19]

Poisner

[11] Patent Number: 5,729,760

[45] Date of Patent: Mar. 17, 1998

[54] SYSTEM FOR PROVIDING FIRST TYPE ACCESS TO REGISTER IF PROCESSOR IN FIRST MODE AND SECOND TYPE ACCESS TO REGISTER IF PROCESSOR NOT IN FIRST MODE

[75] Inventor: David I. Poisner, Folsom, Calif.

[73] Assignee: Intel Corporation, Santa Clara, Calif.

[21] Appl. No.: 667,789

[22] Filed: Jun. 21, 1996

[51] Int. Cl.$^6$ .................................................. G06F 15/02
[52] U.S. Cl. .......................... 395/823; 395/186; 395/856
[58] Field of Search .................................... 395/823, 186, 395/490, 726, 733, 739, 740, 742, 800, 500, 856

[56] References Cited

U.S. PATENT DOCUMENTS

| | | | |
|---|---|---|---|
| 5,339,437 | 8/1994 | Yuen | 395/734 |
| 5,357,628 | 10/1994 | Yuen | 395/183.1 |
| 5,392,420 | 2/1995 | Balmer et al. | 395/500 |
| 5,475,829 | 12/1995 | Thome | 395/479 |
| 5,509,139 | 4/1996 | Ayash et al. | 395/869 |
| 5,544,344 | 8/1996 | Frame | 395/471 |
| 5,596,741 | 1/1997 | Thome | 395/490 |
| 5,623,673 | 4/1997 | Gephardt et al. | 395/733 |
| 5,630,052 | 5/1997 | Shah | 395/183.14 |
| 5,638,532 | 6/1997 | Frame et al. | 395/481 |
| 5,657,445 | 8/1997 | Pearce | 395/186 |

Primary Examiner—Moustafa M. Meky
Attorney, Agent, or Firm—Blakely, Sokoloff, Taylor & Zafman

[57] ABSTRACT

A method of providing access to an input/output (I/O)-mapped register of a computer system is described. The computer system includes a processor operable in a system management mode (SMM), in which the processor accesses a dedicated system management memory space, a real mode, a protected mode and a virtual 8086 mode. The method includes the steps of firstly receiving an access request at the I/O-mapped register. Logic circuitry associated with the I/O-mapped register then determines whether the processor is operating in SMM by examining the status of a system management interrupt acknowledge (SMIACT#) output of the processor. If the logic circuitry determines that the processor is operating in SMM, a first, unrestricted type of access by the processor to the I/O-mapped register is provided. Alternatively, if the logic circuitry determines that the processor is not operating in SMM, a second, restricted type of access by the processor to the I/O-mapped register is provided. If the first, unrestricted type of access is provided to the processor, it performs an operation, under the direction of code stored in the dedicated system management memory address space, on the contents of the I/O-mapped register.

18 Claims, 11 Drawing Sheets

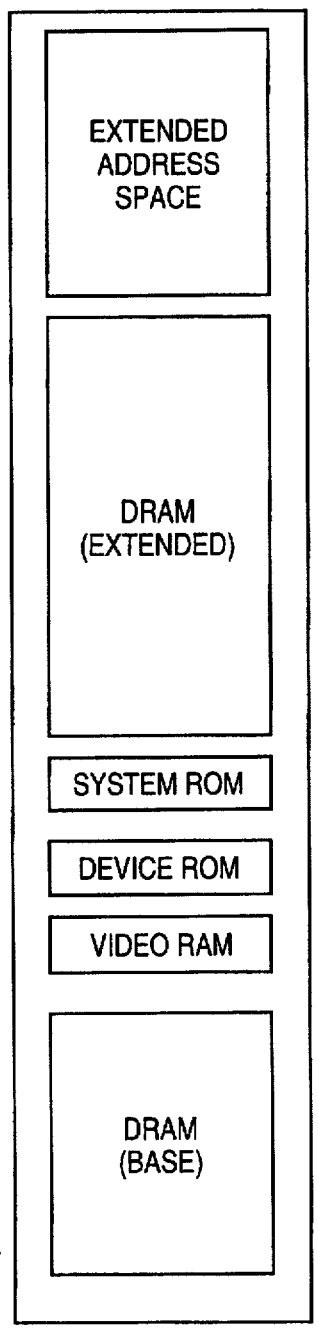
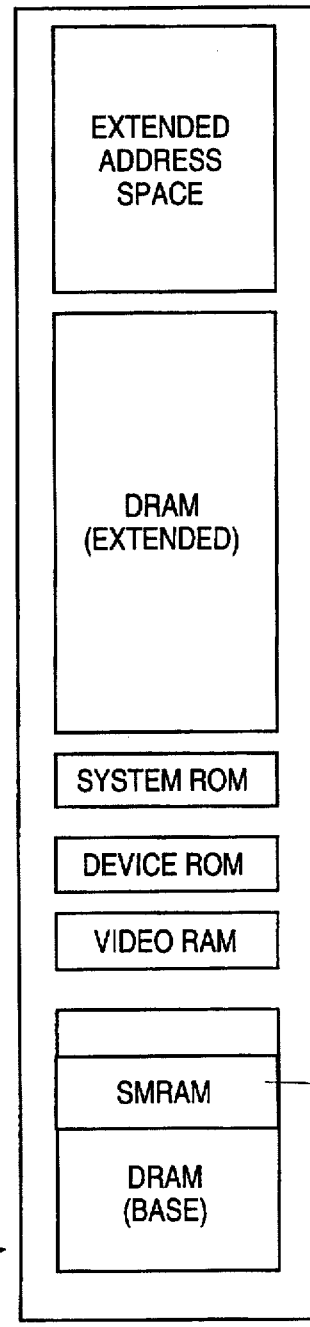
*FIG. 3A*  *FIG. 3B*

SYSTEM FOR PROVIDING FIRST TYPE ACCESS TO REGISTER IF PROCESSOR IN FIRST MODE AND SECOND TYPE ACCESS TO REGISTER IF PROCESSOR NOT IN FIRST MODE

FIELD OF THE INVENTION

The present invention pertains to the field of computer systems. More particularly, the present invention relates to a method and apparatus for controlling access to a register mapped to the input/output (I/O) address space of a computer system so as, inter alia, to protect the register.

BACKGROUND OF THE INVENTION

Registers mapped to the I/O address space (termed I/O-mapped registers) are commonly located within interfaces for interfacing between a computer system and a peripheral device. I/O-mapped registers may also be located in a number of other functional units within a computer system, such as a bus bridge, and may be utilized for a number of functions, including data buffering, status indication and control and configuration functions.

I/O-mapped registers are vulnerable to having their contents corrupted or undesirably altered in a number of ways. For example, a "berserk" or malfunctioning program, a virus program or even the operating system itself may attempt to alter the contents of an I/O-mapped register in an illegal manner. The corruption of the contents of an I/O-mapped register may have very serious consequences for the functioning of the computer system, and also for the physical integrity of the components and peripheral devices of the computer system. This vulnerability is particularly serious when the contents of an I/O-mapped register, performing a control or configuration function, are modified. At the very least, corruption of the register contents may result in a software failure. In a worst case scenario, such as where the I/O-mapped register stores a value relating to power management, corruption of the contents of the register may cause the processor to over-heat and burn. This worst case scenario poses a considerable threat to the integrity of computer system hardware and software, and even to the safety of a computer system user. The vulnerability of I/O-mapped registers also provides authors of virus programs with the opportunity to write virus programs which cause untold mischief and disruption within a computer system.

Prior art methods of providing access protection for an I/O-mapped register include providing a "locking" mechanism whereby a lock/unlock value is written to a dedicated "lock" register associated with an I/O-mapped register. Prior to access of the I/O-mapped register, a protection algorithm is executed which determines, by inspection of the "lock" register, whether the I/O-mapped register can be accessed. While this method provides relatively effective protection against an attempt by a malfunctioning program to access the I/O-mapped register, it does not provide adequate protection against an intelligent foe, such as virus program. The virus program may, for example, gain access to, and overwrite, the "lock" register, or may attack and bypass the protection algorithm.

A microprocessor architecture (termed Intel Architecture) developed by Intel Corporation of Santa Clara, Calif., also provides protection mechanisms for I/O-mapped registers. Details of these protection mechanisms are provided in "Pentium® Processor User's Manual, Volume 3: Architecture and Programming Manual", published 1994, pages 12-1 to 12-8, and pages 15-5 to 15-9. Specifically, the Intel architecture makes provision for two I/O access protection mechanisms. Under both protection mechanisms, an I/O access is checked in parallel with address translation to determine whether it satisfies various protection requirements.

The first I/O protection mechanism recognizes four privilege levels, labeled 0 to 3, under the so-called "protection ring model". A program being executed by the processor has a privilege level, termed the Current Privilege Level (CPL), which is stored in the lower two bits of the CS segment register. Access to I/O instructions, such as IN and OUT, by an application program is controlled by an Input/Output Protection Level (IOPL), which is compared to the CPL to determine whether the application program can validly access an I/O instruction. This protection mechanism generally allows the operating system, which has a privilege level of 0, and certain device drivers, which have privilege levels of 1, to access I/O instructions, while blocking access to I/O instructions by applications, and less privileged device drivers, which have a privilege level of 3. However, this protection mechanism is not effective against a virus program that manages to obtain a privilege level of 0, or against a poorly written device driver having a level 1 privilege.

The second I/O protection mechanism provides an I/O permission bit map which controls access to individual registers mapped to the I/O address space. This protection mechanism is an implementation of the "locking" mechanism described above. Briefly, each bit of the bit map corresponds to an I/O register byte, and the relevant bit is tested by the processor before accessing an I/O-mapped register. If the tested bit is set, a general-protection error is generated. On the other hand, if the test bit is not set, the I/O operation can proceed. However, this protection mechanism suffers from the inadequacies detailed above with reference to "locking" mechanisms.

The above protection mechanisms also suffer from the drawback of providing either complete access or denying any access to the I/O address space. This "all or nothing" approach is inflexible, and does not permit varying degrees or levels of protection to be afforded to an I/O-mapped register.

Finally, aside from the protection issue, it is desirable to facilitate more flexible use of I/O-mapped registers. Such registers are typically limited to performing a single function and may, depending on the operating condition of the computer system, comprise an under-utilized resource in certain scenarios, while there may exist a shortage of the resource provided by an I/O-mapped register in another scenario.

SUMMARY OF THE INVENTION

According to a first aspect of the invention there is provided a method of providing access to an input/output (I/O)-mapped register of a computer system, the computer system including a processor operable in at least first and second operational modes. The method includes the steps of firstly receiving an access request to the I/O-mapped register. Logic circuitry associated with the I/O-mapped register then determines whether the processor is operating in the first mode, which may be a system management mode (SMM). If the logic circuitry determines that the processor is operating in the first mode, a first, unrestricted type of access by the processor to the I/O-mapped register is provided. Alternatively, if the logic circuitry determines that the processor is operating in the second mode, a second, restricted type of access by the processor to the I/O-mapped register is provided. If the first, unrestricted type of access is provided to the processor, it performs an operation, on the contents of the I/O-mapped register, under the direction of code stored in a dedicated system management memory address space.

The step of providing a first type of access may comprise providing at least read access to the I/O-mapped register, and the step of providing a second type of access may comprise preventing access to the I/O-mapped register. Alternatively, the step of providing a first type of access may comprise providing both read and write access to the I/O-mapped register, and the step of providing a second type of access may comprise providing only read access to the I/O-mapped register.

According to a second aspect of the invention there is provided a method of controlling access to a register mapped to an input/output (I/O) address space within a computer system. The computer system defines a memory address space, the I/O address space, and a system management mode (SMM) memory address space. The computer system further includes a processor operable in a system management mode (SMM) in which the processor accesses the SMM memory address space. The method requires receiving a system management request at the processor, and then placing the processor in the system management mode in response receiving the system management request. Thereafter, the processor is provided with a first type of access to the register, and performs an operation on the contents of the register. The processor is then placed out of the system management mode, and provided with a second type of access to the register.

According to a third aspect of the invention there is provided an interface arrangement for use in a computer system. The computer system is operable in first and second modes of operation. The interface arrangement includes a register mapped to an input/output (I/O) address space, a decoder having an input to receive address data identifying the register, and an output to provide a select signal to the register, and logic circuitry configured to detect when the computer system is operating in the first mode, and configured to provide a first type of access to the register when the computer system is operating in the first mode, and to provide a second type of access to the register when the computer system is not operating in the first mode.

The invention extends to a computer system including an interface arrangement as described above. Other features of the present invention will be apparent from the accompanying drawings and from the detailed description which follows.

BRIEF DESCRIPTION OF THE DRAWINGS

The present invention is illustrated by way of example in the figures of the accompanying drawings, in which like references indicate similar elements and in which:

FIG. 3A is a block diagram showing processor address space when a processor is not operating in a system management mode.

FIG. 3B is a block diagram showing processor address space when a processor is operating in a system management mode.

DETAILED DESCRIPTION

A method and apparatus for controlling access to a register mapped to an input/output (I/O) address space of a computer system are described. In the following description, for purposes of explanation, numerous specific details are set forth in order to provide a thorough understanding of the present invention. It will be evident, however, to one skilled in the art that the present invention may be practiced without these specific details.

I/O Address Space

Computer systems employing certain processor architectures provide two distinct address spaces, namely a memory address space, and an I/O address space. Registers within I/O interfaces and other functional units are mapped to the I/O address space, and are referred to as I/O-mapped registers. Generally, an I/O port has a dedicated I/O-mapped register associated therewith. However, two or more I/O-mapped registers may share a common port, if appropriate circuitry is provided for directing data between the registers and ports. I/O-mapped registers may perform a number of functions within a computer system, such as data buffering, status and configuration indication, and control functions.

In one embodiment, a computer system allows I/O-ports to be addressed in two ways, namely through a memory-mapped I/O operation, where I/O ports appear in the memory address space, and through a separate I/O address space accessed using I/O instructions. These instructions include IN and OUT instructions.

System Management Mode

Figure 1:
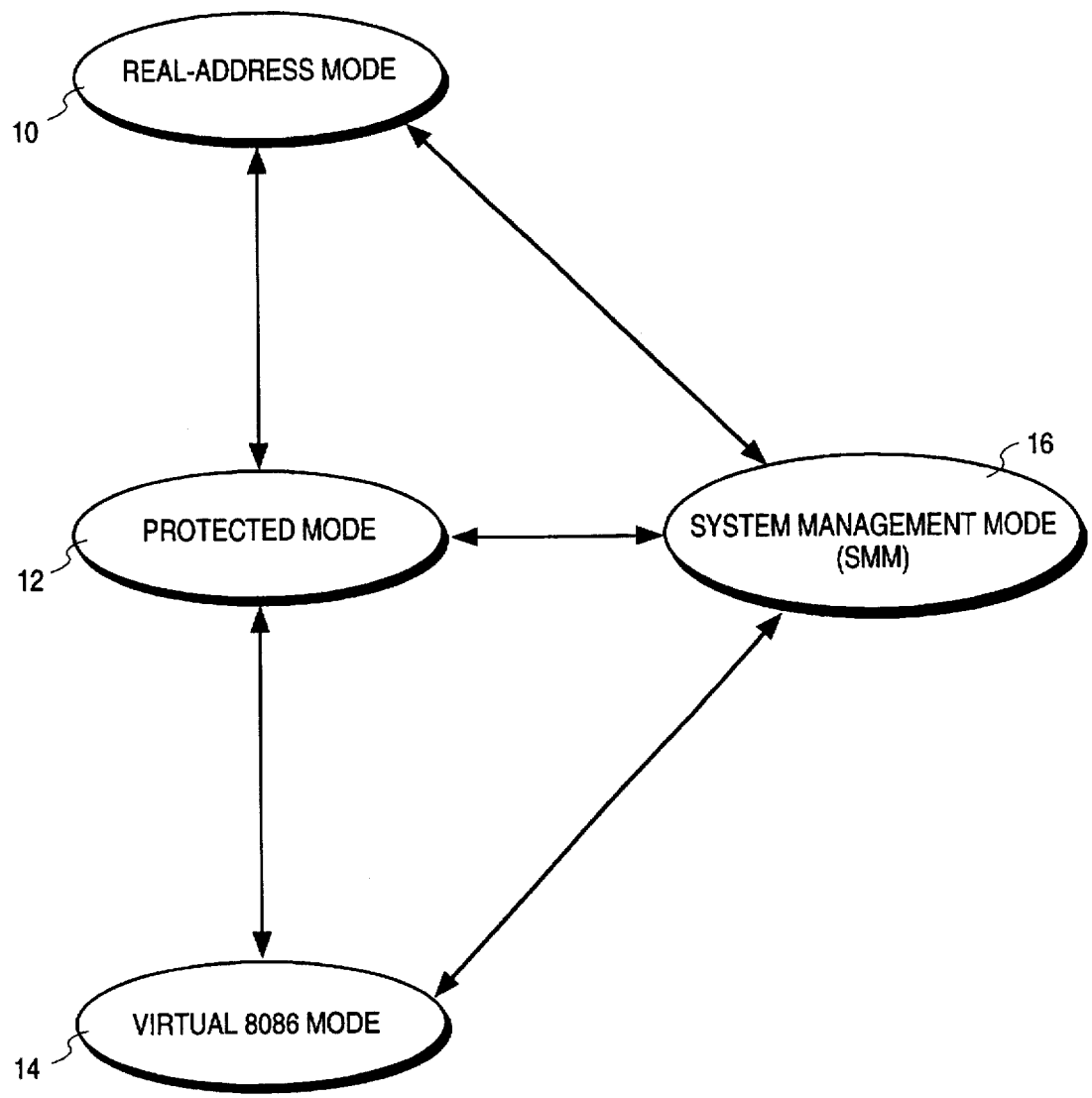
FIG. 1 is a state diagram indicating the various modes of operation of a processor.

Processors within a computer system may be designed to operate in a number of different modes, in which various features and functions are enabled or disabled. The enabling and disabling of these features may be motivated by a wide range of considerations including performance optimization, backwards compatibility and function transparency. For example, the Pentium® processor manufactured by Intel Corporation of Santa Clara, Calif., is capable of operating in any one of the four modes illustrated in FIG. 1, namely:
1. a Real-Address Mode 10;
2. a Protected Mode 12;
3. a Virtual 8086 Mode 14; and
4. a System Management Mode (SMM) 16.

Such modes are well-known in the art.

The SMM 16 provides high level systems functions, such as power management and security, in a manner transparent to both application software and the operating system. For example, code to power-down a peripheral device after it has been idle for a pre-determined amount of time is stored in a dedicated SMM address space, termed the system management random access memory (SMRAM). This code can be accessed when a processor enters the SMM 16, and executed completely transparently to the operating system, device drivers and application software. This negates the necessity for application and operating system software developers to customize software to incorporate such power management features.

Figure 2:
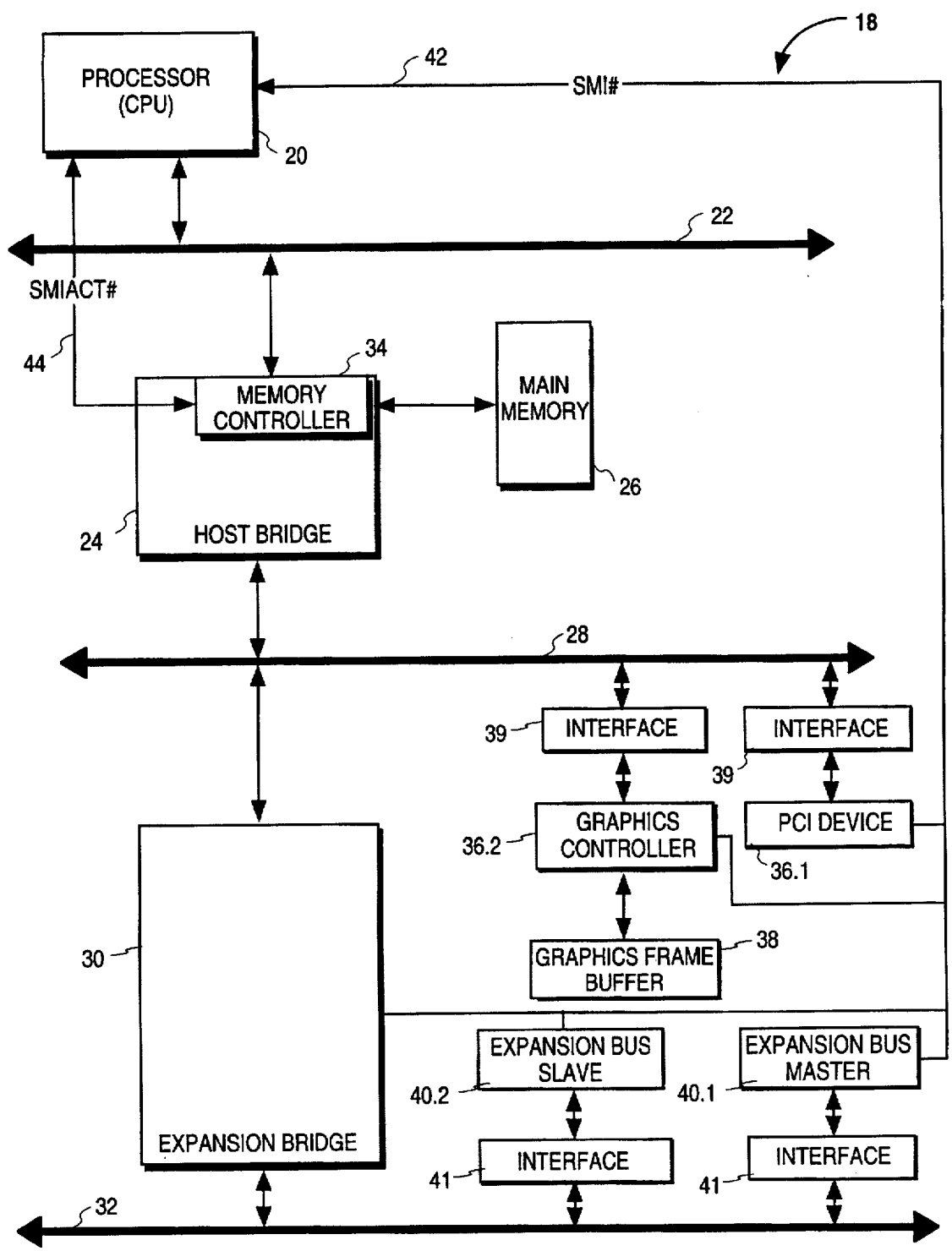
FIG. 2 is a block diagram showing a computer system in which the present invention may be realized.

Referring to FIG. 2, a computer system 18 capable of operating in SMM 16, and within which the present invention can be employed, is shown. The computer system 18 has as its primary components a processor 20, a host bus 22, a host bridge 24, main memory 26, an intermediate bus 28, an expansion bridge 30 and an expansion bus 32.

The processor 20 processes signals, performs computations and controls operations. The host bridge 24 provides an interface between the host bus 22 and the intermediate bus 28. In one embodiment, the intermediate bus 28 is a Peripheral Components Interconnect (PCI) bus, and is operated according to the Peripheral Components Interconnect (PCI) Local Bus Specification, Revision 2.1, published Jun. 1, 1995. The expansion bridge 30 provides an interface between the intermediate bus 28 and the expansion bus 32, and is viewed by an intermediate bus arbiter (not shown) as a PCI device. In one embodiment, the expansion bus 32 is either an Industry Standard Architecture (ISA) bus or an Extended Industry Standard Architecture (EISA) bus.

The host bridge 24 incorporates a memory controller 34 for controlling access to the main memory 26. A PCI device 36.1, which may be an input/output (I/O) device or a further expansion bridge, is coupled to the intermediate bus 28 via an interface 39. Examples of I/O devices are well-known and may include Small Computer System Interface (SCSI) controllers, Personal Computer Memory Card International Association (PCMCIA) interfaces and keyboard controllers. A graphics controller 36.2 is also coupled to the intermediate bus 28 via an interface 39, and controls access to a graphics frame buffer 38. An expansion bus master 40.1 and an expansion bus slave 40.2 are coupled to the expansion bus 32 via interfaces 41. The expansion bus master 40.1 may, for example, be a Direct Memory Access (DMA) controller. The expansion bus slave 40.2 may be a floppy disk drive.

The interfaces 39 and 41 include a number of registers (not shown), including data-buffering, control and status registers, and appropriate decoding logic (not shown), which will be described in further detail below. The expansion bridge 30 provides an interface between the intermediate bus 28 and the expansion bus 32. The expansion bridge 30 may also include registers of the types described above and decoding logic. Accordingly, for the purposes of this specification, the term "interface arrangement" shall be taken to refer to either interfaces which provide an interface between a computer system and a peripheral device (such as interfaces 39 and 41) or to bus bridges (such as the expansion bridge 30). Furthermore, an interface arrangement could be incorporated into the computer system or the peripheral device, or could be a discrete functional unit.

As shown in FIG. 2, the expansion bridge 30, the graphics controller 36.2, the PCI device 36.1, the expansion bus master 40.1 and the expansion bus slave 40.2 are coupled to a provide a system management interrupt (SMI#) signal 42 to the processor 20. The SMI# signal 42 is a non-maskable interrupt having a higher priority than all other interrupts, including other non-maskable interrupts. The processor 20 is coupled to provide a system management interrupt acknowledge (SMIACT#) signal 44 to the memory controller 34, the SMIACT# signal 44 being asserted in response to the assertion of the SMI# signal 42. The # designation following each signal indicates that the signal is active low, and is accordingly asserted by a low transition. It will be appreciated that any peripheral device, bus bridge, power management circuit or security circuit may be coupled to provide the SMI# signal 42 to the processor 20.

When the SMI# signal 42 is asserted, the processor 20, in acknowledgment, asserts the SMIACT# signal 44 to notify the memory controller 34 that the next processor access will be to system management random access memory (SMRAM) 50. FIG. 3A shows the processor address space 46 prior to entry into the SMM, while FIG. 3B shows the processor address space 48 after assertion of the SMIACT# signal 44. As is shown in FIG. 3B, the SMRAM 50 is mapped to an address range within processor address space 48. After assertion of the SMI# signal 42 by a device, the processor 20 waits for all outstanding data write operations to complete, and then saves register state information into the SMRAM 50. The processor then enters SMM 16 by setting internal registers to initial SMM state conditions, and begins execution of a SMI handler (not shown) which is stored at a predetermined entry point within the SMRAM 50. While in SMM 16, the processor 20 is able to access the entire I/O address space, and the entire memory address space. When the SMI handler is invoked it will firstly examine a status vector to determine the nature and source of the SMI# signal 42. Having identified the nature and source of the request, the SMI handler then executes a SMM routine which addresses and services the request. The SMI# signal 42 may be asserted by a number of devices for a number of reasons, the most common requests being to:

(a) power-down an idle device;
(b) power-up a device to which access is required;
(c) modify the format of data in a register so as to allow compatibility between the computer system 18 and a peripheral device;
(d) service mobile computing functions which are not serviceable by the operating system (e.g. docking functions);
(e) throttle clocks and oscillators;
(f) save state information for the computer system; and
(g) power-down the computer system.

Other functions dependent on the system design may also cause the assertion of the SMI# signal 42. Once the SMI handler has executed the appropriate SMM routine, a return from system management (RSM) instruction is issued, and the processor state that was stored upon entry into SMM is restored. Accordingly, SMM 16 provides a transparent and convenient manner of servicing system management functions within the computer system 18.

Apparatus Description

Figure 4:
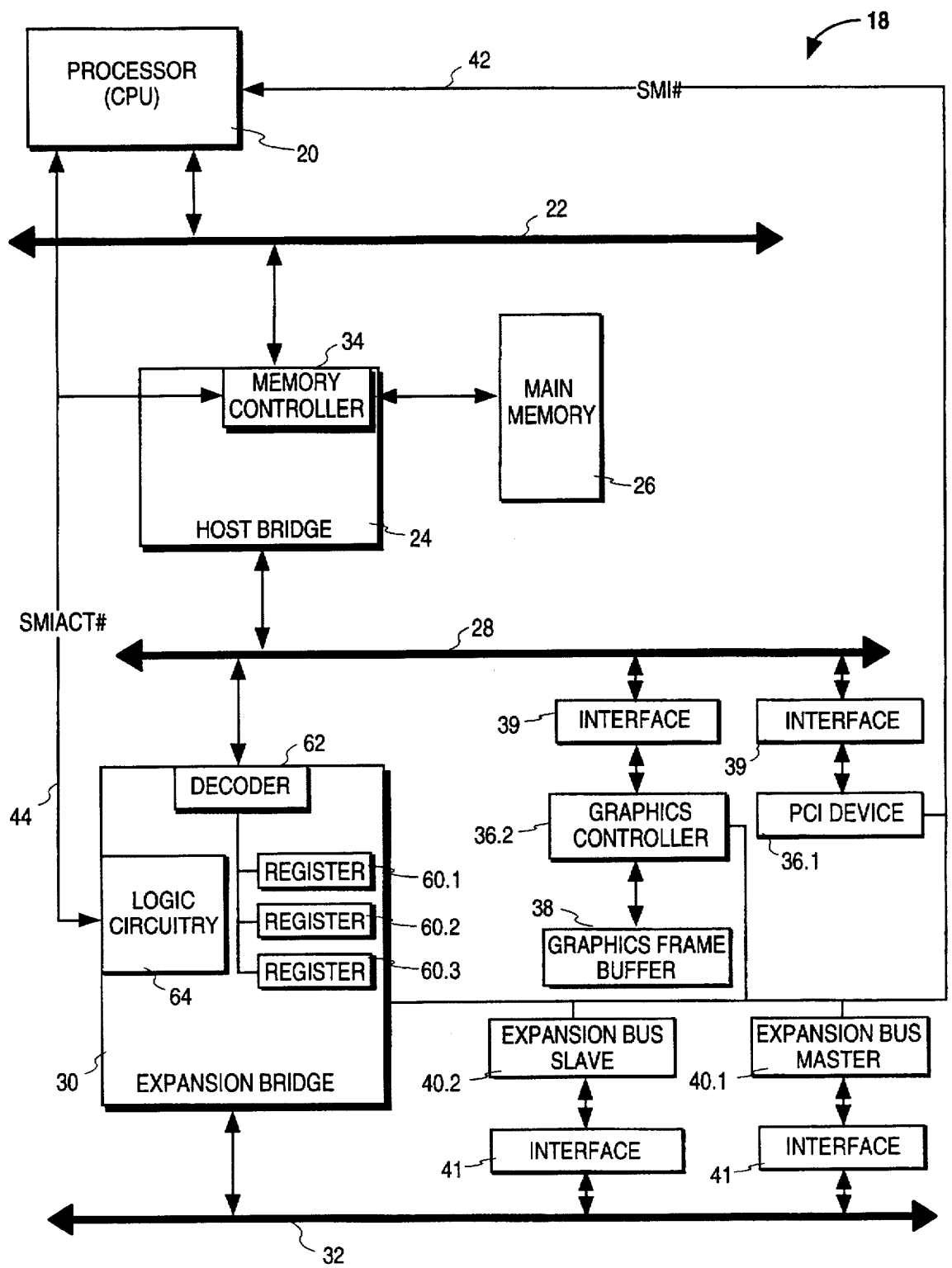
FIG. 4 is a block diagram showing a computer system incorporating apparatus for controlling access to an I/O-mapped register according to the invention.

Turning now to FIG. 4, there is shown the computer system 18 incorporating one embodiment of the present invention. The expansion bridge 30 is shown to include a plurality of registers 60.1 to 60.3, these registers 60 being mapped to the I/O address space. The registers 60.1 to 60.3 are configured to perform a number of functions, including data-buffering, status indication and various control functions. The expansion bridge 30 also includes a decoder 62 which is coupled to receive address and control information from the intermediate bus 28, and to select one of the registers 60.1 to 60.3 for access by the processor 20 or another device within the computer system 18. Logic circuitry 64 is also shown to be included within the expansion bridge 30, and to be coupled to receive the SMIACT# signal 44 from the processor 20. Accordingly, by monitoring the SMIACT# signal 44, the logic circuitry 64 is able to detect when the processor 20 enters SMM 16.

The logic circuitry 64 is functional to provide a first type of access to the registers 60.1 to 60.3 when it detects that the processor 20 is in SMM 16, and to provide a second type of access to the registers 60.1 to 60.3 when it detects that the processor 20 in not in SMM 16 (i.e. in real-address, protected or virtual 8086 mode). More specifically, the logic circuitry 64 allows full read/write access to the registers 60.1 to 60.3 when the processor 20 is detected to be in SMM 16, while preventing, or blocking, access to the registers 60.1 to 60.3 when the processor is not in SMM 16. FIG. 4 shows the logic circuitry 64 as being coupled to the decoder 62, and providing an input into the decoder 62 to achieve the functionality described above. It will however be appreciated that the logic circuitry 64 could be incorporated into the decoder 62, or could alternatively be located down-stream of the decoder 62 to gate a select signal from the decoder 62 when the processor 20 is not in SMM 16.

Furthermore, the first type of access allowed by the logic circuitry 64 need not be full read/write access, and the second type of access need not be a complete access block. For example, the first type of access could be read access only, paired with a second type of access providing a complete access block to a specific register. Alternatively, the first type of access could be full read/write access, paired with a second type of access allowing only read access to a register.

The first and second access types described above are effective to provide varying degrees of protection to a register, by either totally preventing, or merely limiting, access to a register when the processor 20 is not in SMM 16. Accordingly, the above described arrangement provides a simple, yet effective, protection against malfunctioning programs, virus programs or even an operating system kernel which may otherwise have been able to access, and illegally modify, the contents of the registers 60. The secure protection afforded to the registers 60 as described above is particularly valuable when any one of the registers 60.1 to 60.3 is used for power management and system configuration purposes, as corruption of data stored in such a register could have serious implications for the integrity of data, software and even physical devices within the computer system 18.

The first and second types of access need not relate to degrees of access to the registers 60, but can relate to the manner in which the registers 60 themselves operate. For example, the first type of access allowed by the logic circuitry 64 may be to facilitate access to the register 60.1 as a serial port, and the second type of access may be to allow access to the register 60.1 as a parallel port, or vice versa.

Figure 5:
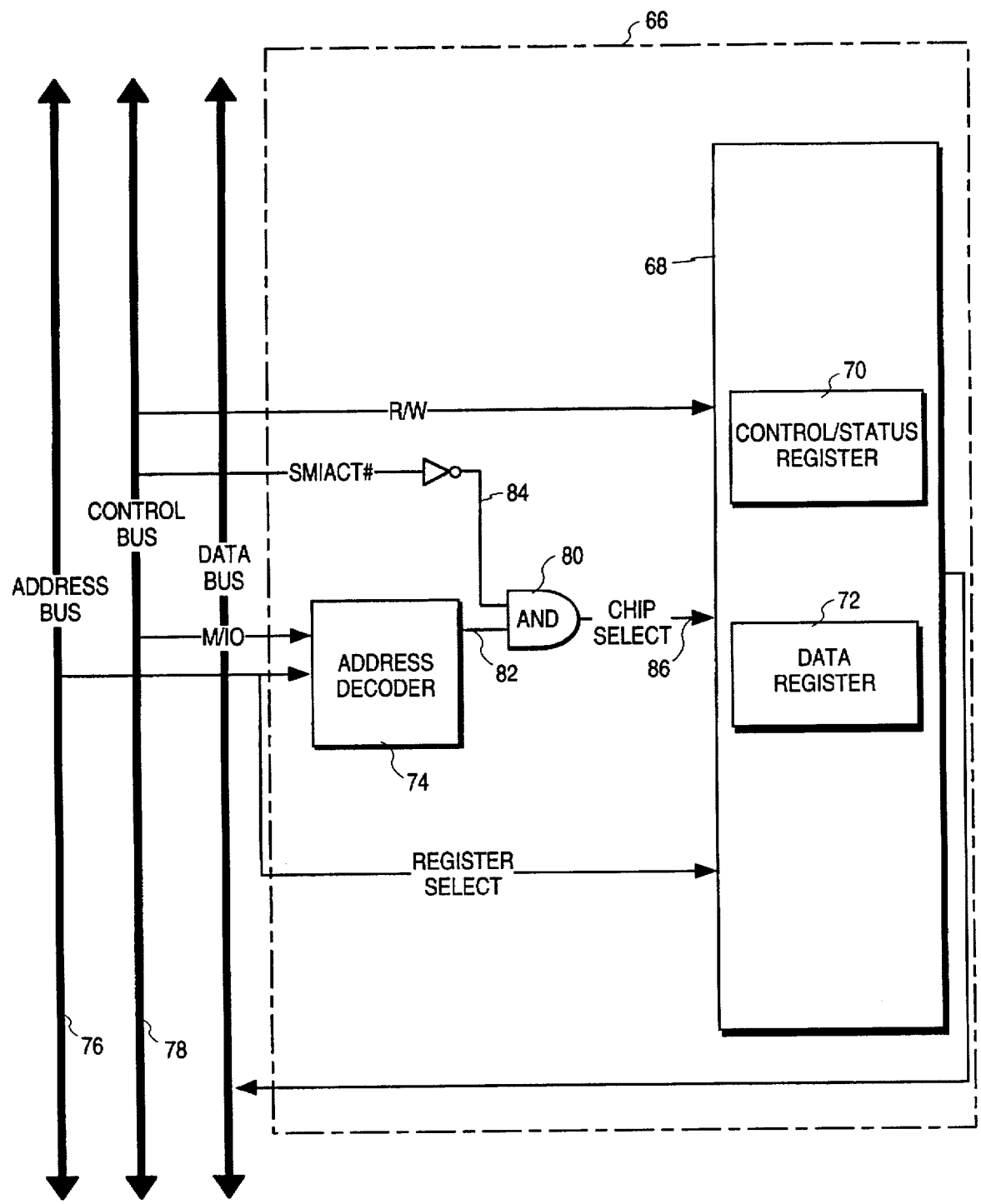
FIG. 5 is a block diagram showing a first embodiment of a circuit arrangement for controlling access to an I/O-mapped register according to the invention.
Figure 6:
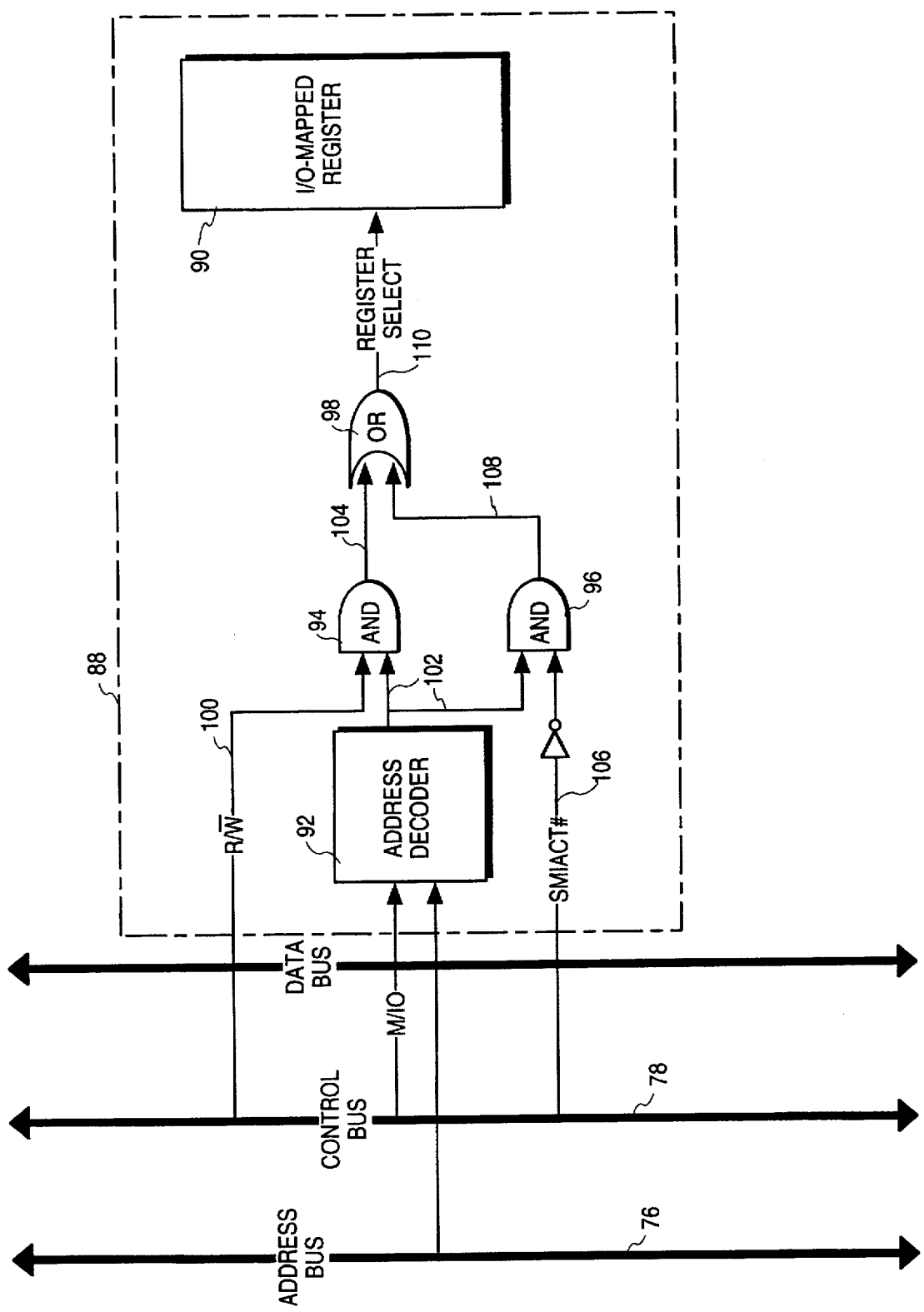
FIG. 6 is a block diagram showing a second embodiment of a circuit arrangement for controlling access to an I/O-mapped register according to the invention.
Figure 7:
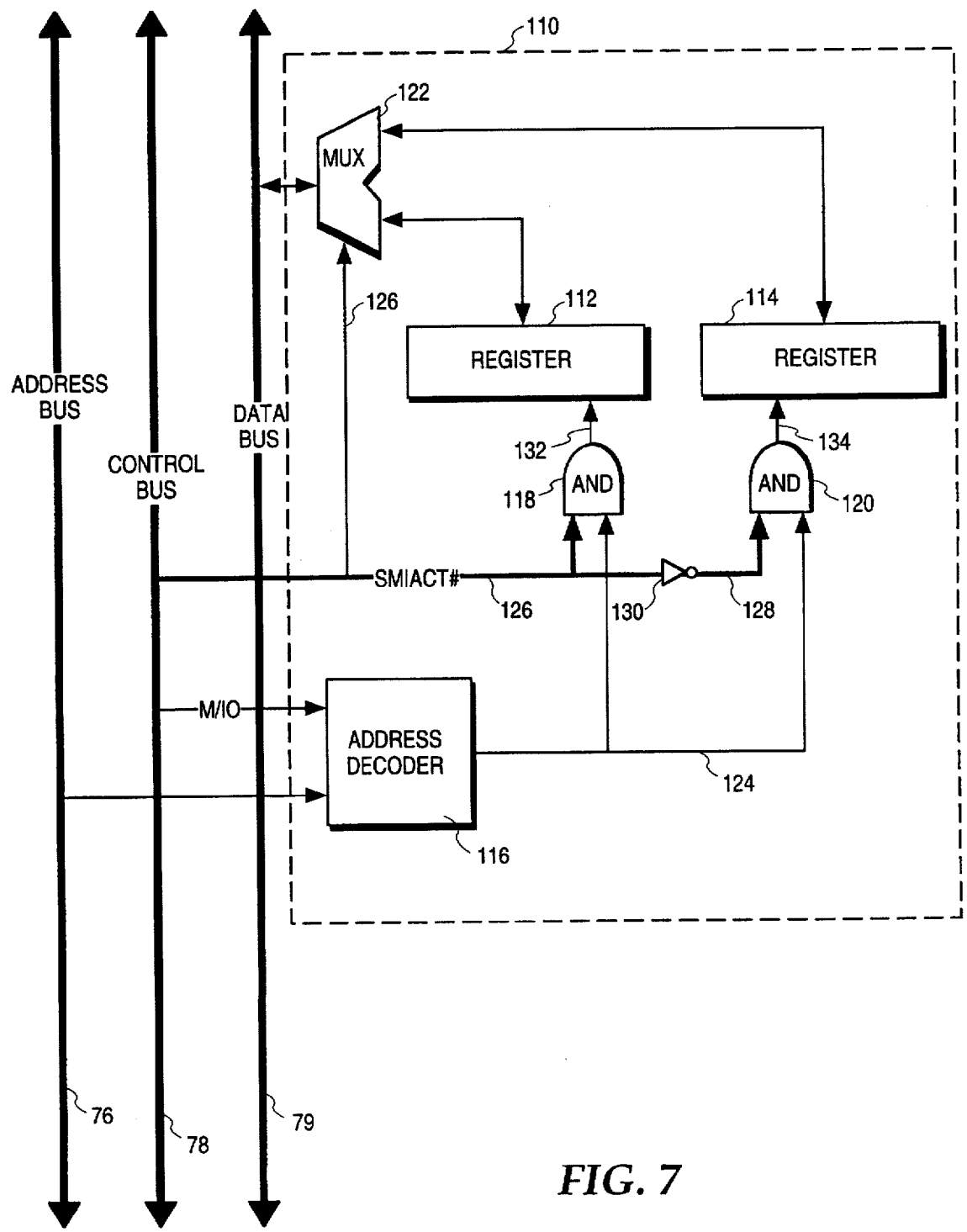
FIG. 7 is a block diagram showing a third embodiment of a circuit arrangement for controlling access to an I/O-mapped register according to the invention.

FIGS. 5 to 7 illustrate in more detail circuit arrangements for facilitating the first and second types of access to an I/O-mapped register. Referring firstly to FIG. 5, there is shown a circuit arrangement 66, including a chip 68 having a control/status register 70 and a data register 72, the registers 70 and 72 being mapped to the I/O address space. The circuit arrangement 66 further includes an address decoder 74, which is coupled to receive address data from an address bus 76, and a memory/input-output (M/IO) signal from a control bus 78. The circuit arrangement 66 also includes logic circuitry in the form of an AND gate 80, which is coupled to receive a SELECT signal 82 from the address decoder 74, and a SMIACT# signal 84 from the control bus 78. The AND gate 80 is also coupled to provide a CHIP SELECT signal 86 to the chip 68. Accordingly, by allowing the AND gate 80 to gate the SELECT signal 82 from the address decoder 74, the AND gate 80 is able to prevent any access to the registers 70 and 72 when a processor from which the SMIACT# signal 84 originates is not operating in SMM 16. In this way, the register 70 and 72 are protected from corruption or unauthorized modification when the processor is not in SMM 16.

FIG. 6 shows a further embodiment of the present invention, in which a circuit arrangement 88 includes an I/O-mapped register 90, and an address decoder 92. The address decoder 92 is coupled to receive address data from an address bus 76, and a memory/input-output (M/IO) signal from a control bus 78. The circuit arrangement 88 also includes logic circuitry comprising AND gates 94 and 96, and an OR gate 98. The AND gate 94 is coupled to receive a read/write (R/W) signal 100 from the control bus 78 and a SELECT signal 102 from the address decoder 92, and to output a SELECT1 signal 104 to the OR gate 98. The AND gate 96 is coupled to receive the SELECT signal 102 from the address decoder 92 and a SMIACT# signal 106 from the control bus, and to output a SELECT2 signal 108 to the OR gate 98. The OR gate 98 outputs a REGISTER SELECT signal 110 to the register 90. Accordingly, it will be appreciated that when the SMIACT# signal 106 is de-asserted, the decoder 92 and logic circuitry configuration shown in FIG. 4 will only permit read access to the register 90. However, when the SMIACT# signal 106 is asserted both read and write access to the register 90 is facilitated.

FIG. 7 shows yet another embodiment of the present invention, in which a circuit arrangement 110 includes a pair of registers 112 and 114 which are both mapped to the same I/O address. The circuit arrangement 110 also includes an address decoder 116. The address decoder 116 is coupled to receive address data from an address bus 76, and a memory/input-output (M/IO) signal from a control bus 78. The circuit arrangement 110 also includes AND gates 118 and 120 and a multiplexer (MUX) 122. The AND gates 118 and 120 are each coupled to receive a SELECT signal 124 from the address decoder 116. The AND gate 118 is further coupled to receive an SMIACT# signal 126 from the control bus, while AND gate 120 is coupled to receive an inverted SMIACT# signal 128 from an inverter 130. The AND gate 118 provides a SELECT1 signal 132 to the register 112 when a processor from which the SMIACT# signal originates is not in SMM 16. Similarly, the AND gate 120 provides a SELECT2 signal 134 to the register 114 when the processor from which the SMIACT# signal originates is in SMM 16. The MUX 122 is a bi-directional multiplexer, and couples one of the registers 112 or 114 to a data bus 79, depending on whether the SMIACT# signal 126 is high or low. More specifically, when the SMIACT# signal is asserted (i.e. low), indicating that the processor is in SMM 16, the MUX 122 will couple the register 114 to the data bus 79 for either a read or write operation. Alternatively, should the SMIACT# signal 126 not be asserted (i.e. high), indicating that the processor is not in SMM 16, the MUX 122 will couple the register 122 to the data bus 79.

Accordingly, the contents of the register 114 are inaccessible when the processor is not in SMM 16, and protected from access, and possible corruption, by a virus or a malfunctioning program when the processor is not in SMM 16.

It will further be appreciated that the registers described above can be of varying sizes, and accordingly the resolution with which the present invention can be applied to provide protection can also be varied. For example, each of the registers described above could have a size of between 1 and 124 bits.

Method Description

Figure 8:
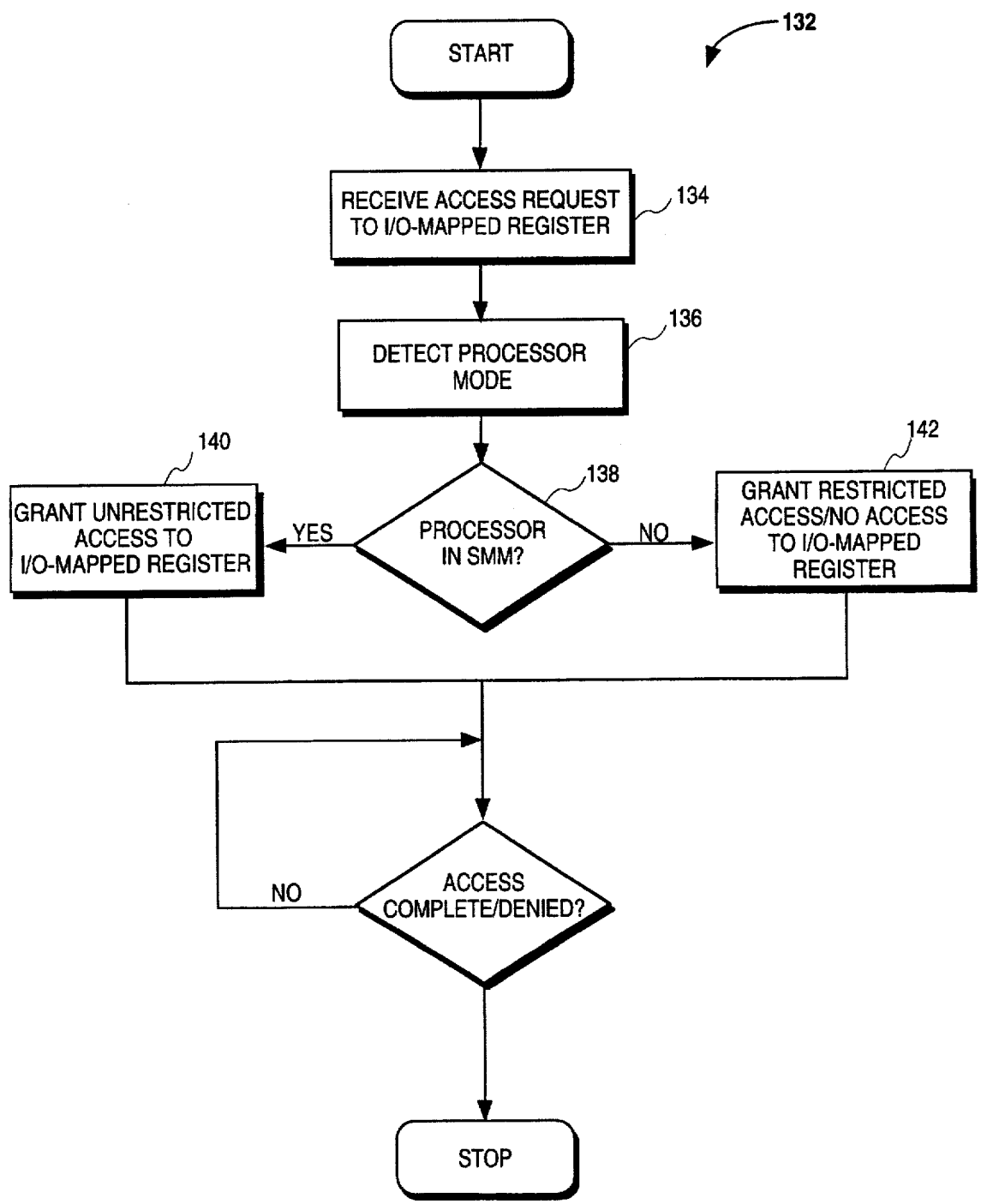
FIG. 8 is a flow-chart illustrating one embodiment of a method of controlling access to an I/O-mapped register according to the invention.

Turning now to FIG. 8, a method 132 of controlling access to an I/O-mapped register is illustrated. The method comprises firstly receiving a request to access an I/O-mapped register at decoder and logic circuitry associated with the I/O-mapped register at step 134. At step 136, the logic circuitry detects the processor mode. More specifically, it is detected whether a processor from which the access request issued is functioning in SMM by examining an SMIACT# signal originating from the processor. If it is determined at step 138 that the processor is functioning in SMM, then the method proceeds to step 140, and the processor is granted unrestricted access to the I/O-mapped register. Alternatively, if it is determined at step 138 that the processor is not functioning in SMM, then the method proceeds to step 142, and the processor is either granted restricted or no access to the I/O-mapped register.

Figure 9:
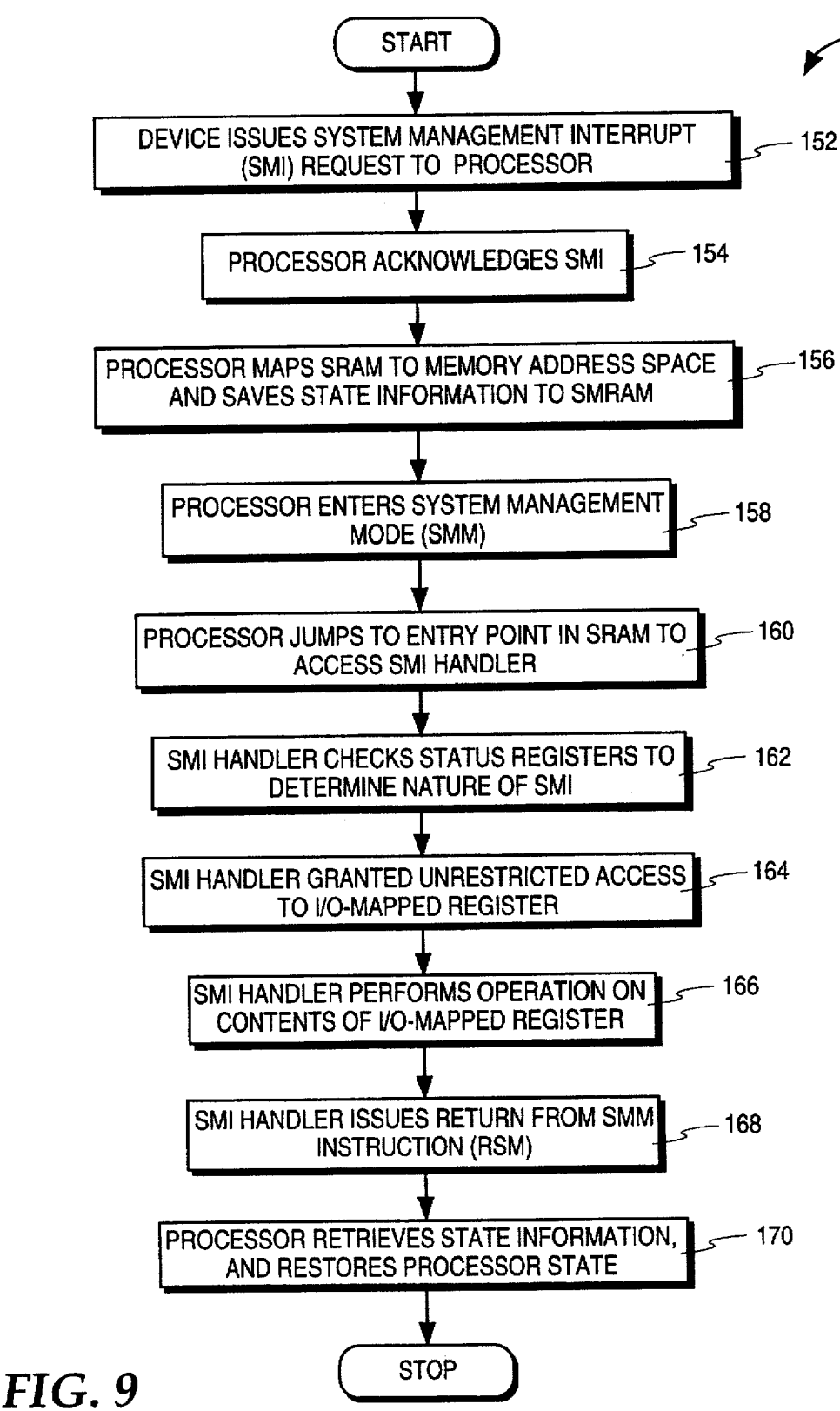
FIG. 9 is a flow-chart illustrating one embodiment of a method by which a processor obtains unrestricted access to an I/O-mapped register.
Figure 10:
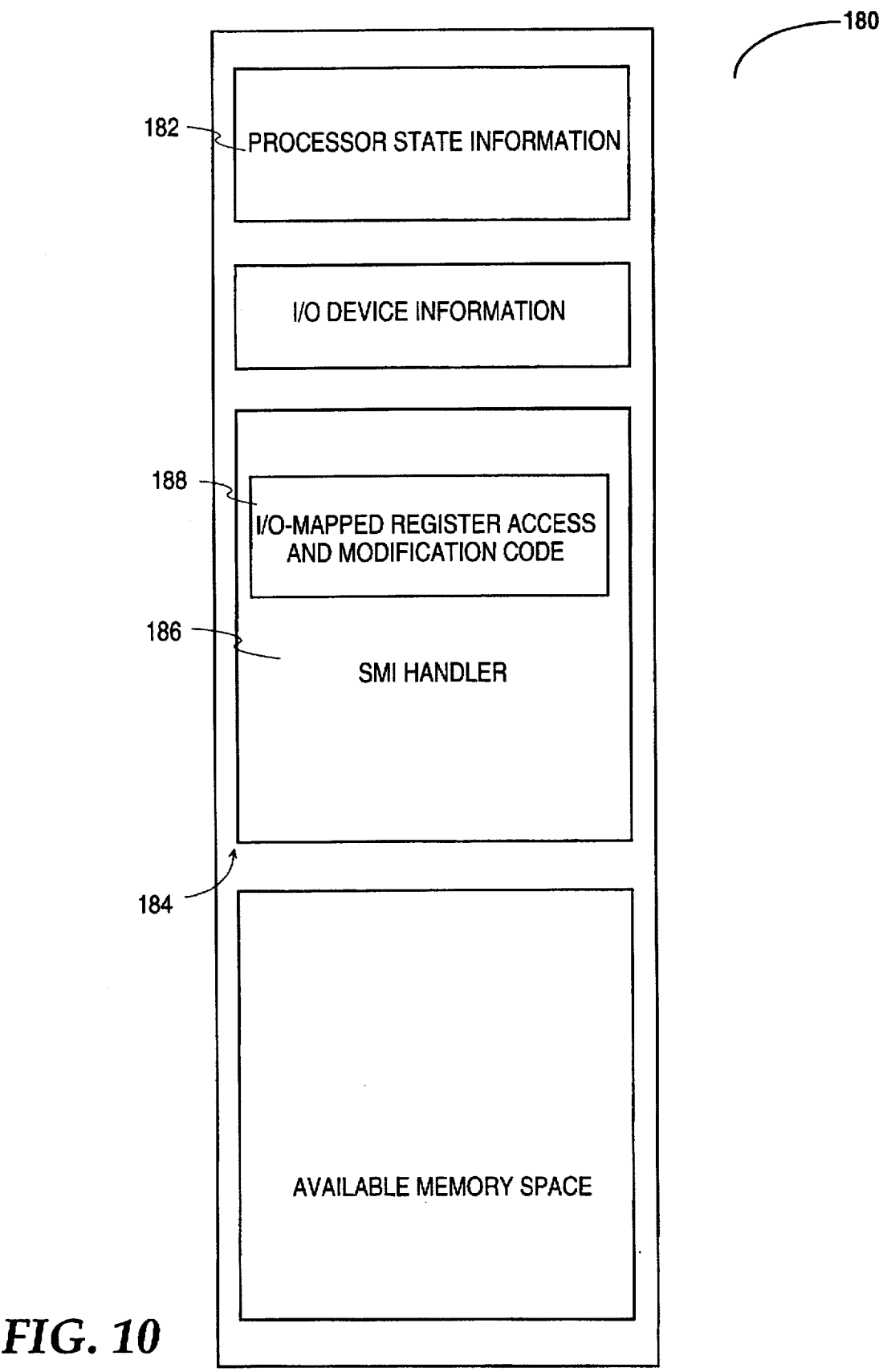
FIG. 10 is a diagrammatic representation of a system management random access memory (SMRAM) according to the invention.

A method 150 by which a processor obtains unrestricted access to an I/O-mapped register is illustrated in FIG. 9. At step 152, a device, such as a bus bridge incorporating a control register which is mapped to the I/O address space and which is performing a power management function, issues a system management interrupt request to a processor by asserting a SMI# signal. At step 154, the processor acknowledges the request by asserting a SMIACT# signal. The processor then proceeds to map the SMRAM to a memory range in the memory address space, as shown in FIG. 3B, and writes processor state information to the SMRAM at step 156. FIG. 10 provides a diagrammatic representation of SMRAM 180, and shows the location of the processor state information 182 written to the SMRAM 180 at step 156. At step 158, the processor enters SMM, and at step 160 the processor jumps to an entry point 184 in the SMRAM 180 to access an SMI handler routine 186. The SMI handler routine 186 then checks status registers (also termed a status vector) to determine the nature and source of the SMI request at step 162. In the present example, the status register reveals that the SMI request originated from the bus bridge described above and that the contents of the control register thereof require modification. For example, the control register may contain a "throttle" value indicative of a percentage of the full operating frequency at which the processor is to operate. Accordingly, the status register will reveal that the SMI request was issued in response to a need to "throttle down" the operating frequency of the processor, and accordingly to reduce the "throttle" value. At step 164, the SMI handler routine 186 is given unrestricted access to the relevant I/O-mapped register, as described above, by reason of the assertion of the SMIACT# signal. At step 166, the SMI handler routine 186 performs the required operation on the contents of the register (i.e. on the "throttle" value).

More specifically, the SMI handler routine 186 executes the I/O-mapped register access and modification code 188, which comprises part of the SMI handler routine 186, as shown in FIG. 10. Having completed execution on the code 188, the SMI handler routine 186 issues a return from SMM (RSM) instruction at step 168. The processor then retrieves the processor state information 182 at step 170, and restores the processor state that existed prior to issuance of the SMI# signal at step 152.

Figure 11A:
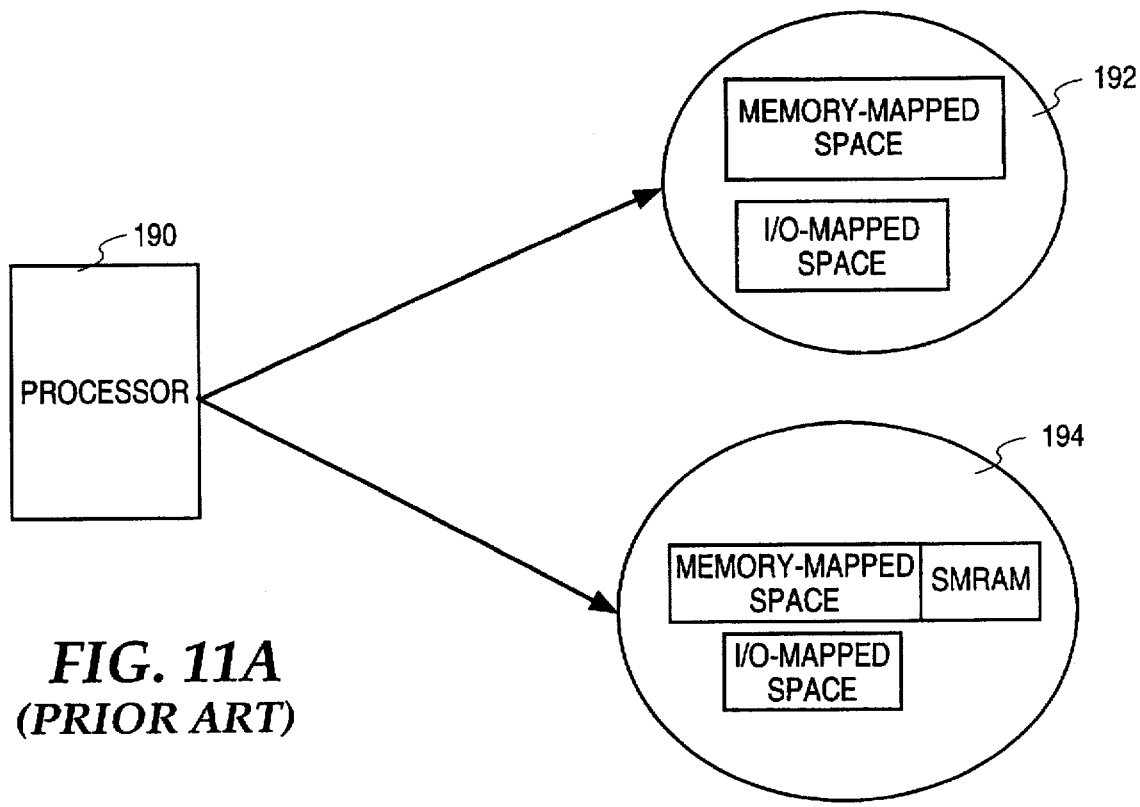
FIG. 11A is a diagrammatic representation of the address spaces accessed by a processor in a prior art computer system.
Figure 11B:
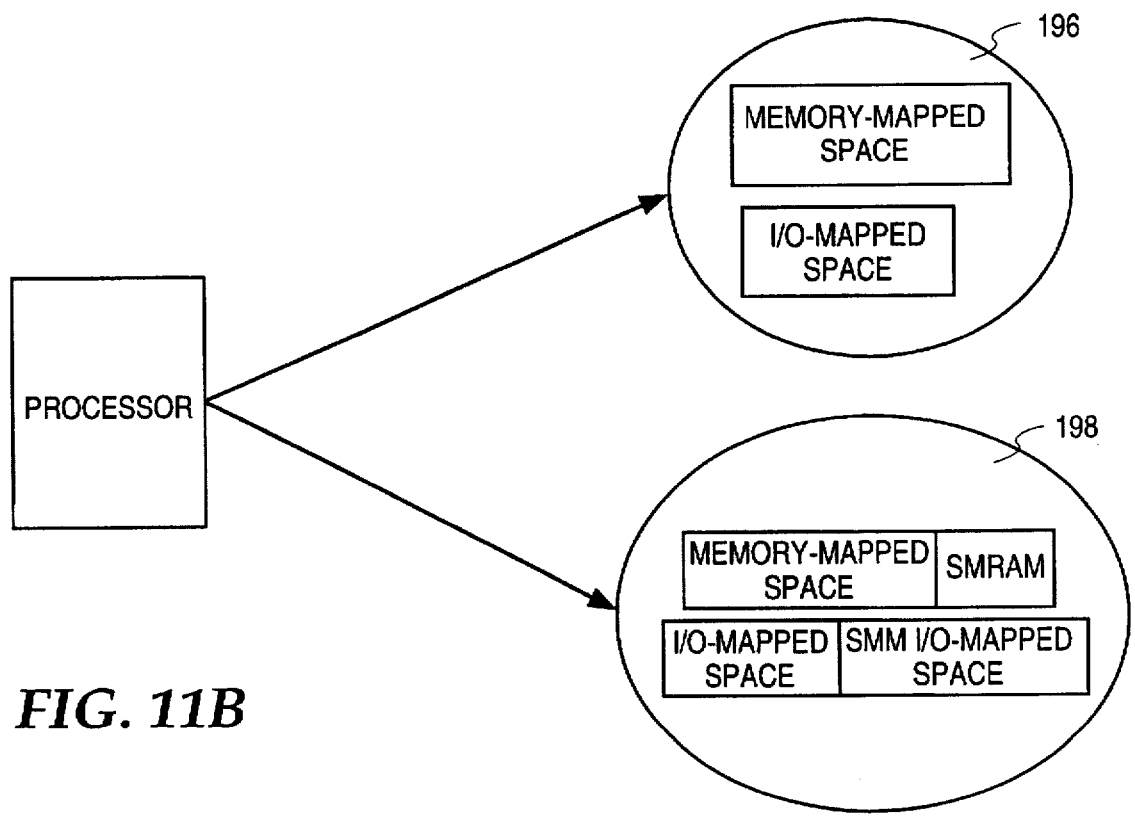
FIG. 11B is a diagrammatic representation of the address spaces accessed by a processor in a computer system incorporating the present invention.

FIGS. 11A and 11B show two address space schemes, the address space scheme of FIG. 11A being implemented in the prior art, and the address space scheme of FIG. 11B being achievable by the present invention. In the scheme illustrated in FIG. 11A, a processor 190 is shown to have access to the address space indicated in circle 192 when the processor 190 is in the real, protected or virtual 8086 modes of operation, and to the address space indicated in circle 194 when in SMM. As is apparent, the processor 190 has access to the full I/O mapped space in all modes of operation. In the scheme illustrated in FIG. 11B, the processor 190 has access to the address space indicated in circle 196 when the processor is in the real, protected or virtual 8086 modes of operation, and to the address space indicated in circle 198 when in SMM. As indicated in circle 198, the present invention allows for the creation of a dedicated SMM I/O-mapped address space, which is only accessible when the processor is in the SMM mode.

The present invention provides an effective manner of controlling access by a processor or other computer device to an I/O-mapped register. The inclusion of circuitry to implement the present invention can be achieved without incurring a high die space penalty, in view of the simplicity of the circuitry.

The present invention allows for the creation of a protected I/O address space, which can only be accessed when a processor is operating in SMM. As the protection afforded to the protected I/O address space is only lifted when the processor is operating in SMM, the invention provides effective protection to the contents of I/O-mapped register against malfunctioning and virus programs, as well as illegal accesses by the operating system. The present invention is also advantageous in that it allows for the creation of various depths or levels of protection. For example, the protection can be absolute, or the protection can merely extend to blocking write transactions to a protected I/O-mapped register.

The invention may allow for the configuration of I/O-mapped registers for expanded functionality. For example, in a further embodiment, the present invention may allow an I/O-mapped register to be configured as either a serial or parallel data-buffer register, depending on the mode in which the processor is operating.

Thus, a method and apparatus for controlling access to a register mapped to an I/O address space of a computer system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of providing access to an input/output (I/O)-mapped register of a computer system, the computer system including a processor operable in first and second modes of operation, the method including the steps of:
   receiving a request for access to the I/O-mapped register;
   determining whether the processor is operating in the first mode of operation;

providing a first type of access to the I/O-mapped register if the processor is operating in the first mode of operation; and providing a second type of access to the I/O-mapped register if the processor is not operating in the first mode of operation.

2. The method of claim 1 wherein the first mode of operation is a system management mode in which the processor accesses a dedicated system management memory address space, and the step of determining comprises determining whether the processor is operating in the system management mode.

3. The method of claim 2 further comprising the step of performing an operation, under the direction of code stored in the dedicated system management memory address space, on the contents of the I/O-mapped register if the first type of access to the I/O-mapped register is provided.

4. The method of claim 2 wherein the step of determining whether the processor is operating in the system management mode comprises the steps of:

receiving a system management mode status signal from the processor; and monitoring the system management mode status signal to determine whether the processor is operating in the system management mode.

5. The method of claim 1 wherein the second type of access is restricted relative to the first type of access, so as to provide protection for the I/O-mapped register from predetermined access types when the processor is not operating in the first mode.

6. The method of claim 5 wherein the step of providing a first type of access comprises providing at least read access to the I/O-mapped register, and wherein the step of providing a second type of access comprises preventing access to the I/O-mapped register.

7. The method of claim 6 wherein the step of providing a first type of access comprises providing both read and write access to the I/O-mapped register.

8. The method of claim 5 wherein the step of providing a first type of access comprises providing both read and write access to the I/O-mapped register, and wherein the step of providing a second type of access comprises providing only read access to the I/O-mapped register.

9. A method of providing access to a register mapped to an input/output (I/O) address space of a computer system including a processor, the method including the steps of:

receiving a system management request at the processor;

placing the processor in a system management mode in response to receipt of the system management request;

providing the processor with a first type of access to the register mapped to the input/output (I/O) address space of the computer system;

performing an operation on the contents of the register;

the processor out of the system management mode; and providing the processor with a second type of access to the register.

10. The method of claim 9 wherein the computer system accesses a dedicated SMM memory address space when in the system management mode, and wherein the operation on the contents of the register is performed by the processor under the direction of code stored in the SMM memory address space.

11. An interface arrangement for use in a computer system, the computer system being operable in first and second modes of operation, the interface arrangement comprising:

a register mapped to an input/output (I/O) address space of the computer system;

a decoder having an input coupled to receive address data identifying the register, and an output coupled to output a select signal indicating that address data identifies the register; and logic circuitry configured to detect when the computer system is operating in the first mode, and configured to provide a first type of access to the register when the computer system is operating in the first mode, and to provide a second type of access to the register when the computer system is not operating in the first mode.

12. The interface arrangement of claim 11 wherein the first mode of operation is a system management mode in which a processor of the computer system accesses a dedicated system management memory address space, and the logic circuitry is configured to provide the first type of access to the register when the processor is operating in the system management mode.

13. The interface arrangement of claim 11 wherein the logic circuitry includes an input coupled to receive a signal from a processor of the computer system which indicates that the computer system is operating in the first mode.

14. The interface arrangement of claim 11 wherein the second type of access is restricted relative to the first type of access, so as to provide protection for the register from predetermined access types when the computer system is not operating in the first mode.

15. The interface arrangement of claim 14 wherein the logic circuitry is configured to provide at least read access to the register when the computer system is operating in the first mode, and to prevent access to the register when the computer system is not operating in the first mode.

16. The interface arrangement of claim 14 wherein the logic circuitry is configured to provide both read and write access to the register when the computer system is operating in the first mode, and to provide only read access to the register when the computer system is not operating in the first mode.

17. The interface arrangement of claim 11 wherein the logic circuitry is configured to provide access to the register as a first type of port when the computer system is operating in the first mode, and to provide access to the register as a second type of port when the computer system is not operating in the first mode.

18. A computer system being operable in a system management mode (SMM), the computer system including:

a processor having access to a dedicated SMM memory address space when the computer system is operating in the system management mode;

an interface arrangement, coupled to the processor, and including:

register mapped to an input/output (I/O) address space of the computer system;

a decoder having an input coupled to receive address data identifying the register, and an output coupled to provide a select signal to the register; and logic circuitry configured to detect when the computer system is operating in the system management mode, and configured to provide a first type of access by the processor to the register when the computer system is operating in the system management mode, and to provide a second type of access by the processor to the register when the computer system is not operating in the system management mode.

* * * * *